(12) United States Patent
Tai et al.

(10) Patent No.: US 11,011,963 B2
(45) Date of Patent: May 18, 2021

(54) APPARATUS AND METHOD FOR ASSEMBLING A MOTOR ROTOR

(71) Applicant: Shanghai XPT Technology Limited, Shanghai (CN)

(72) Inventors: Ya-Li Tai, Taoyuan (TW); Tianle Chen, Shanghai (CN); Mu-Jen Huang, Taipei (TW)

(73) Assignee: XPT (Nanjing) E-powertrain Technology Co., Ltd., Nanjing City (CN)

( * ) Notice: Subject to any disclaimer, the term of this patent is extended or adjusted under 35 U.S.C. 154(b) by 284 days.

(21) Appl. No.: 16/387,557

(22) Filed: Apr. 18, 2019

(65) Prior Publication Data

US 2020/0127541 A1  Apr. 23, 2020

(30) Foreign Application Priority Data

Oct. 23, 2018 (CN) .......................... 201811237634.3
Oct. 23, 2018 (CN) .......................... 201821720017.4

(51) Int. Cl.
| | |
|---|---|
| *H02K 15/02* | (2006.01) |
| *H02K 15/10* | (2006.01) |
| *H02K 15/09* | (2006.01) |
| *B23P 19/027* | (2006.01) |

(52) U.S. Cl.
CPC ............ *H02K 15/09* (2013.01); *B23P 19/027* (2013.01); *Y10T 29/49012* (2015.01)

(58) Field of Classification Search
CPC .... H02K 15/09; H02K 15/08; H02K 15/0012; B23P 19/027; Y10T 29/49012; Y10T 29/53143
USPC ............................................................ 29/598
See application file for complete search history.

(56) References Cited

U.S. PATENT DOCUMENTS

| | | | | |
|---|---|---|---|---|
| 7,336,013 | B2 * | 2/2008 | Pizzichil | H02K 15/0012 |
| | | | | 310/183 |
| 8,193,680 | B2 * | 6/2012 | Fukuda | H02K 15/0012 |
| | | | | 310/211 |
| 8,572,837 | B2 * | 11/2013 | Lyons | H02K 15/0081 |
| | | | | 29/598 |
| 9,038,703 | B2 * | 5/2015 | Thieman | H02K 17/165 |
| | | | | 164/109 |

\* cited by examiner

*Primary Examiner* — Donghai D Nguyen
(74) *Attorney, Agent, or Firm* — Winston Hsu

(57) ABSTRACT

Methods and apparatus are disclosed for assembling a motor rotor. The apparatus includes a rotor fixing module, a conductive bar driving module, a plurality of conductive bars and a pump module. The rotor fixing module supports and holds the rotor. The conductive bar driving module has a plurality of assembling slots. When the pumping module is attached to the conductive bar driving module and each of the conductive bars seals the assembling slots, the pumping module and the assembling slots cooperatively form a sealed chamber, and the pumping module vacuums the sealed chamber to generate a suction force on each of the conductive bars, and the suction force further drives the conductive bars into the assembling slots. The method is for assembling the rotor by utilizing the same procedure mentioned above.

16 Claims, 13 Drawing Sheets

APPARATUS AND METHOD FOR ASSEMBLING A MOTOR ROTOR

BACKGROUND OF THE INVENTION

1. Field of the Invention

The present invention relates to an apparatus for assembling a motor rotor, and more particularly, to an assembly apparatus that can quickly and conveniently assemble a plurality of conductive bars to a rotor.

2. Description of the Prior Art

In general, a rotor is comprised of an axis and a laminated core assembled onto the axis, the laminated core being configured with a plurality of slots into which multiple conductive bars are inserted. Conventionally, the conductive bars are assembled by first fixing the conductive bars on a movable conductive bar assembling plate. The conductive bar assembling plate is then pushed toward the laminated core via a conductive bar driving cylinder so that the conductive bars can be inserted into the plurality of slots on the laminated core. However, the conductive bars and the slots on the conductive bar assembling plate may be difficult to align and assemble during the assembly process due to the difference in manufacturing tolerance when the conductive bars and the conductive bar assembling plate are produced, leading to reduced efficiency during the assembly process of the conductive bars.

SUMMARY OF THE INVENTION

In order to solve the above drawbacks, the present invention discloses an assembly apparatus for assembling a rotor, and the rotor is configured with a plurality of slots passing through two end faces of the rotor. The assembly apparatus comprises a base, a rotor fixing module, a conductive bar driving module, a plurality of conductive bars, and a pumping module. The rotor fixing module is configured on the base to support and fix the rotor onto the base. The conductive bar driving module is disposed on a side of the rotor fixing module and comprises a conductive bar assembling plate. The conductive bar assembling plate is movably disposed on the base and has an assembling-end face and a back-end face, wherein the assembling-end face is configured to face the rotor fixing module, and the back-end face is opposite the assembling-end face. The conductive bar assembling plate is further configured with a plurality of assembling slots connected to the assembling-end face and the back-end face. Each one of the plurality of conductive bars has a rear end and a front end opposite to the rear end, and each one of the plurality of conductive bars is inserted into one of the plurality of assembling slots through the rear end of the conductive bars. The pumping module is disposed on the base and between the rotor fixing module and the rotor. The pumping module comprises an exhaust hood and a pump, and the exhaust hood is attached to one of two end faces of the rotor. A first pumping chamber is formed within the exhaust hood. The pump is coupled with the exhaust hood. When the exhaust hood is attached to one of the two end faces of the rotor, and the front end of each of the plurality of conductive bars seals an opening of each of the plurality of slots on the other of the two end faces of the rotor, the first pumping chamber and the plurality of slots communicating with the first pumping chamber cooperatively form a first sealed chamber, such that the pump is able to vacuum the first sealed chamber and create a suction force on the front end of the plurality of conductive bars and draw the plurality of conductive bars into the plurality of slots of the rotor.

In summary, when the conductive bars are assembled and seal the opening of the plurality of slots of the rotor, the assembly apparatus of the present invention drives the pumping module to attach to the rotor and forma first sealed chamber. Subsequently, the pumping module vacuums the first sealed chamber such that a suction force is exerted on the plurality of conductive bars to drive the said conductive bars into the plurality of slots. The apparatus will reduce the difficulty of inserting the plurality of conductive bars into the slots, thereby increasing the assembly efficiency of the plurality of conductive bars.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustrating specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "assembled" and variations thereof herein are used broadly and encompass direct and indirect connections and installations. Accordingly, the drawings and descriptions will be regarded as illustrative in nature and not as restrictive.

Figure 1:
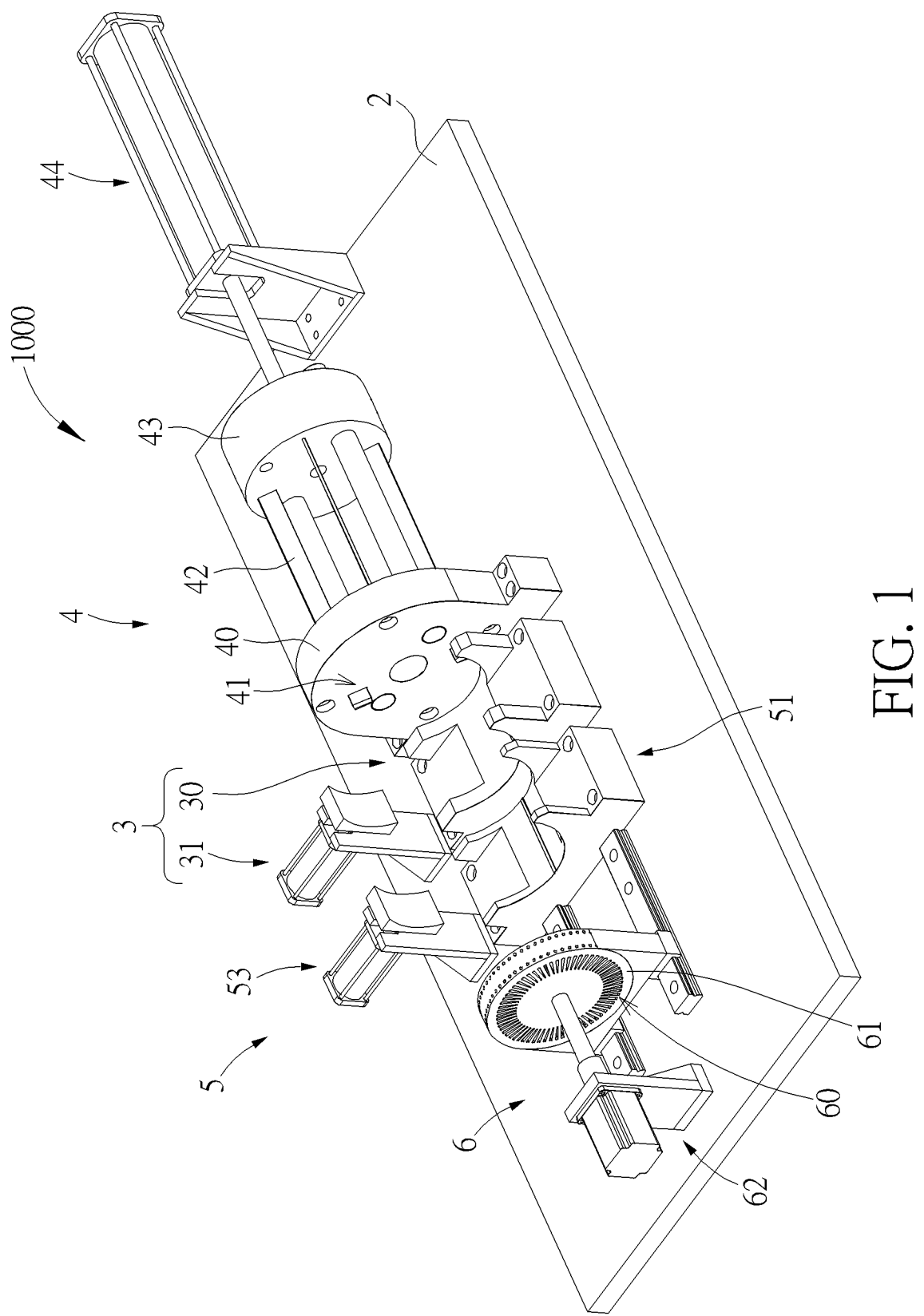
FIG. 1 is a schematic diagram illustrating an assembly apparatus according to an embodiment of the present invention.
Figure 2:
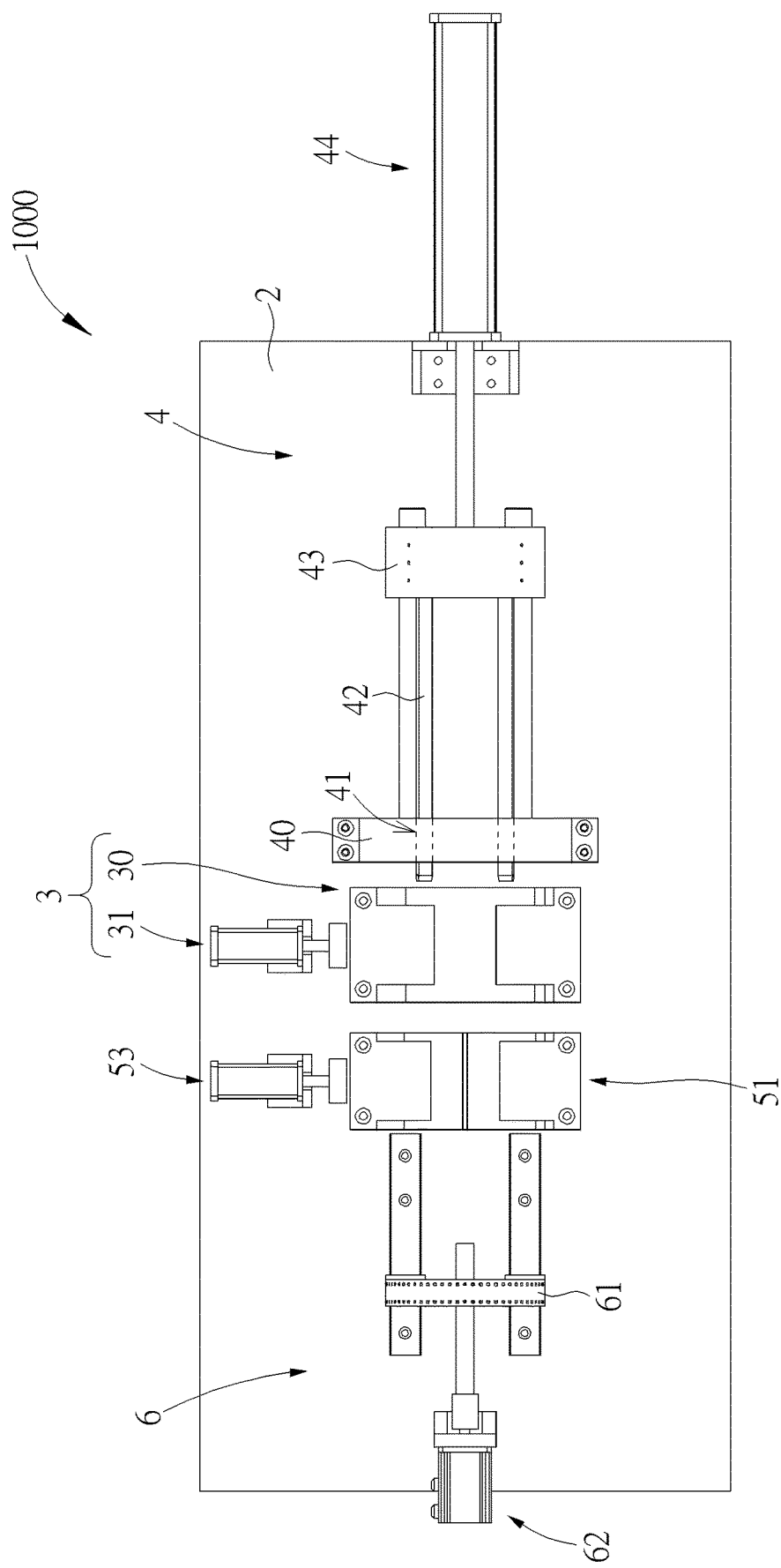
FIG. 2 is a diagram illustrating a top view of the assembly apparatus according to an embodiment of the present invention.
Figure 3:
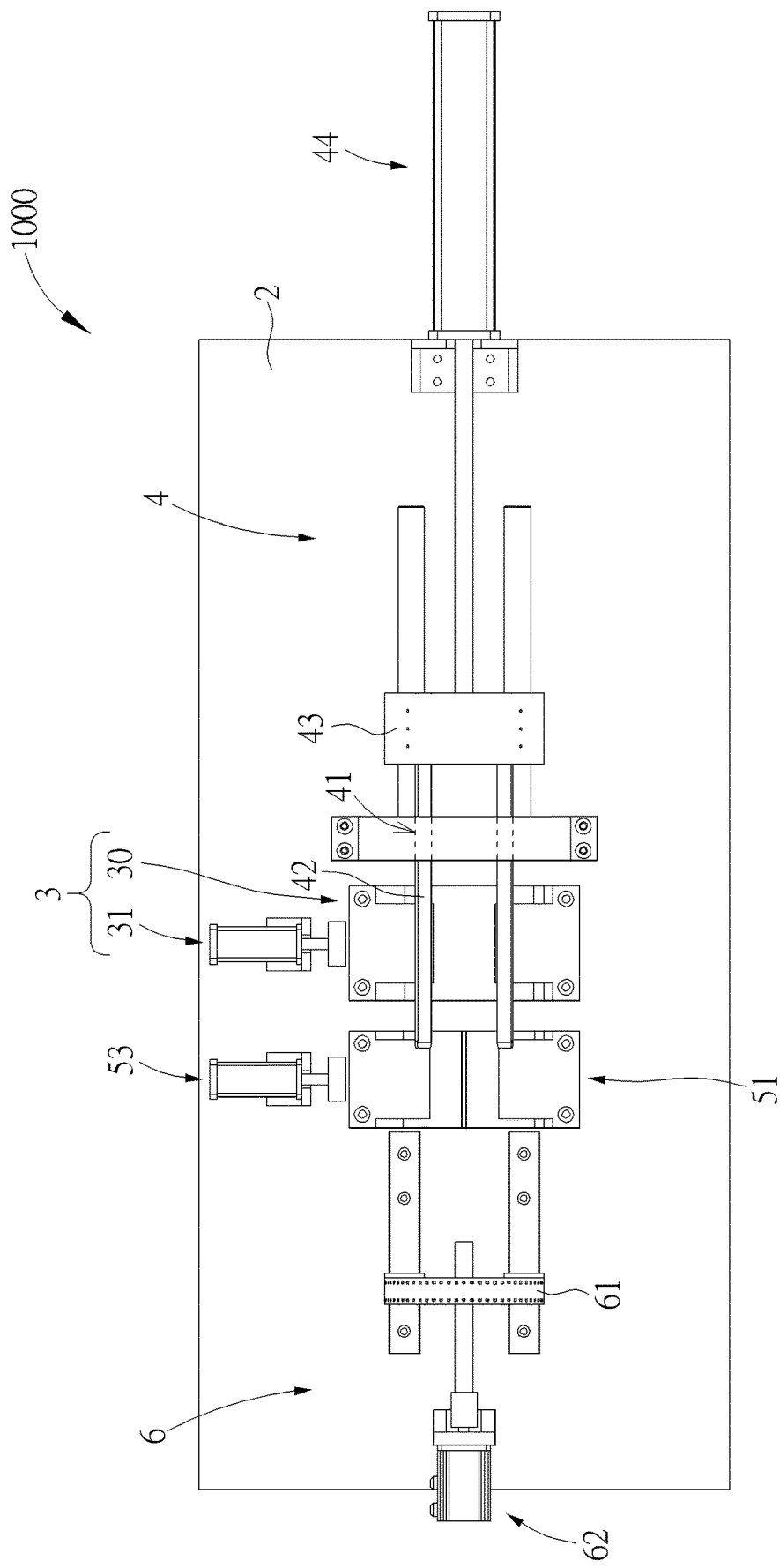
FIG. 3 is a diagram illustrating the top view of the assembly apparatus in another status according to an embodiment of the present invention.
Figure 4:
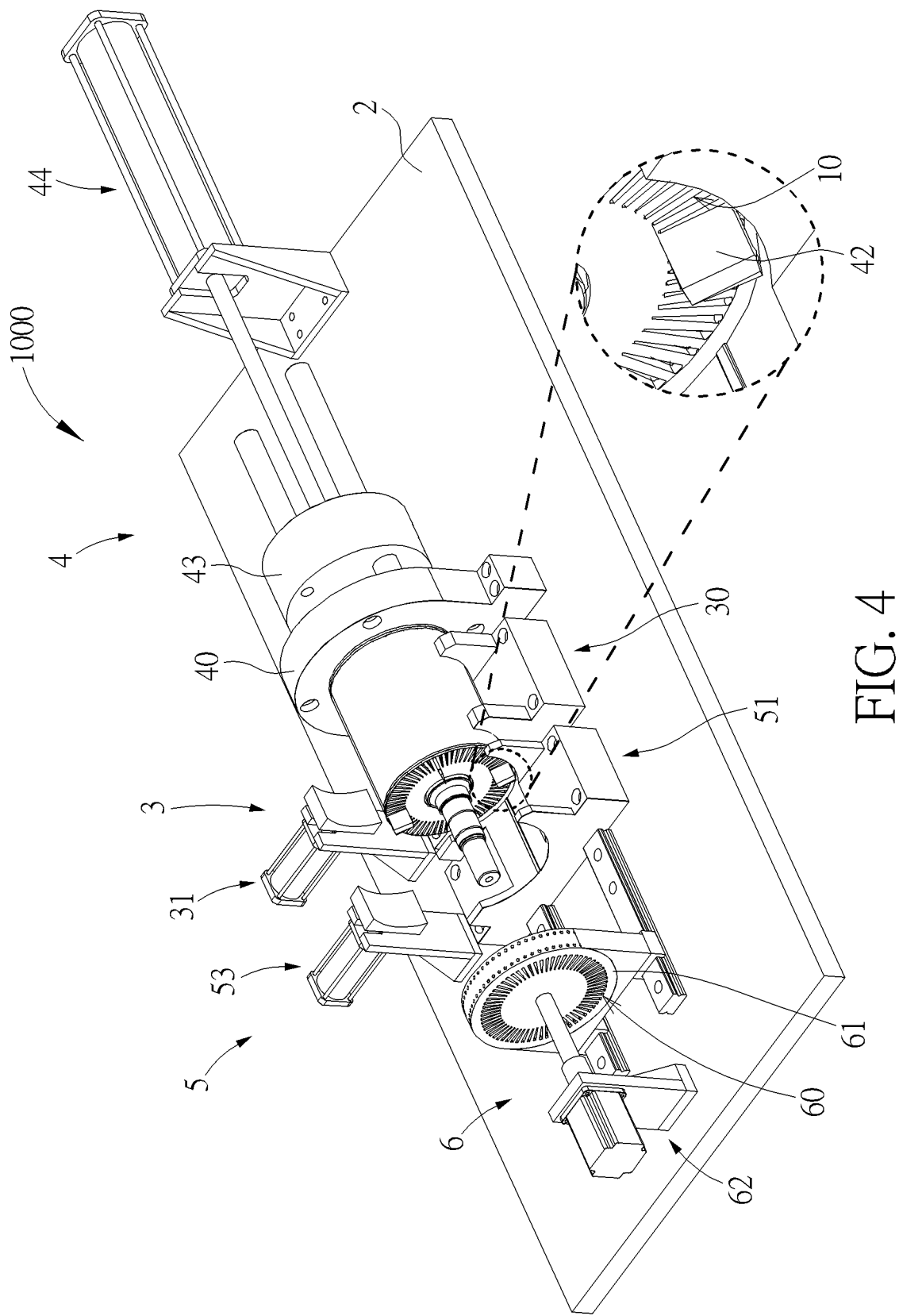
FIG. 4 is a schematic diagram illustrating the assembly apparatus and a rotor being assembled according to an embodiment of the present invention.

Please refer to FIG. 1 to FIG. 4. FIG. 1 is a schematic diagram illustrating the assembly apparatus 1000 according to an embodiment of the present invention. FIG. 2 is a diagram illustrating a top view of the assembly apparatus 1000 according to an embodiment of the present invention. FIG. 3 is a diagram illustrating the top view of the assembly apparatus 1000 in another status according to an embodiment of the present invention. FIG. 4 is a schematic diagram illustrating the assembly apparatus 1000 and a rotor 1 being assembled according to an embodiment of the present invention. As shown in FIGS. 1-4, the assembly apparatus 1000 is used to assemble the rotor 1, and the rotor 1 is configured with a plurality of slots 10 passing through two end faces 11 of the rotor 1 and a peripheral face 12 connecting the two end faces 11. In the present embodiment, the rotor 1 can be a squirrel-cage type induction rotor.

As shown in FIGS. 1-4, the assembly apparatus 1000 comprises a base 2, a rotor fixing module 3, a first alignment module 4 and a conductive bar driving module 6. The rotor fixing module 3 is disposed on the base 2, the conductive bar driving module 6 is disposed on a side of the rotor fixing module 3 and is configured with a plurality of assembling slots 60; the first alignment module 4 is disposed on a side of the rotor fixing module 3 and is used to position the rotor 1 such that each of the plurality of slots 10 is aligned with the plurality of assembling slots 60. Furthermore, the rotor fixing module 3 comprises a rotor mount 30 and a rotor forcing cylinder 31. The rotor mount is disposed on the base 2 and configured to support the rotor 1. The rotor forcing cylinder 31 is disposed on a side of the rotor mount 30. When the rotor 1 is supported by the rotor mount 30, the rotor forcing cylinder 31 is able to push the side wall of the rotor 1 to force the rotor 1 to abut the rotor mount 30 such that the rotor fixing module 3 is able to support and hold the rotor 1 (step 101).

In addition, the first alignment module 4 comprises a rotor alignment plate 40, a rotor alignment bar 42, a bar alignment plate 43 and an alignment bar driving cylinder 44. The rotor alignment plate 40 is fixedly disposed on the base 2 and abuts a side of the rotor 1 while being configured with a rotor alignment slot 41. The bar alignment plate 43 is movably disposed on a side of the rotor alignment plate 40 and used to fix the rotor alignment bar 42. The alignment bar driving cylinder 44 is disposed on a side of the bar alignment plate 43. As shown in FIGS. 2-3, the alignment bar driving cylinder 44 is able to drive the bar alignment plate 43 closer toward the rotor alignment plate 40 such that the bar alignment plate 43 moves from a position shown in FIG. 2 to a position shown in FIG. 3; on the other hand, the alignment bar driving cylinder 44 is also able to drive the bar alignment plate 43 farther away from the rotor alignment plate 40 such that the bar alignment plate moves from a position shown in FIG. 3 to a position shown in FIG. 2.

In this manner, when the rotor 1 is assembled on the rotor fixing module 3, the alignment bar driving cylinder 44 is able to drive the bar alignment plate 43 closer toward the rotor alignment plate 40, allowing each of the rotor alignment bars 42 that is disposed on the bar alignment plate 43 to pass through the plurality of slots 10 of the rotor 1 (as shown in FIG. 4). The first alignment module 4 can thereby position the rotor 1 such that the plurality of slots 10 of the rotor 1 can each align with the plurality of assembling slots 60 of the conductive bar driving module 6 and facilitate subsequent assembly and installation.

Figure 5:
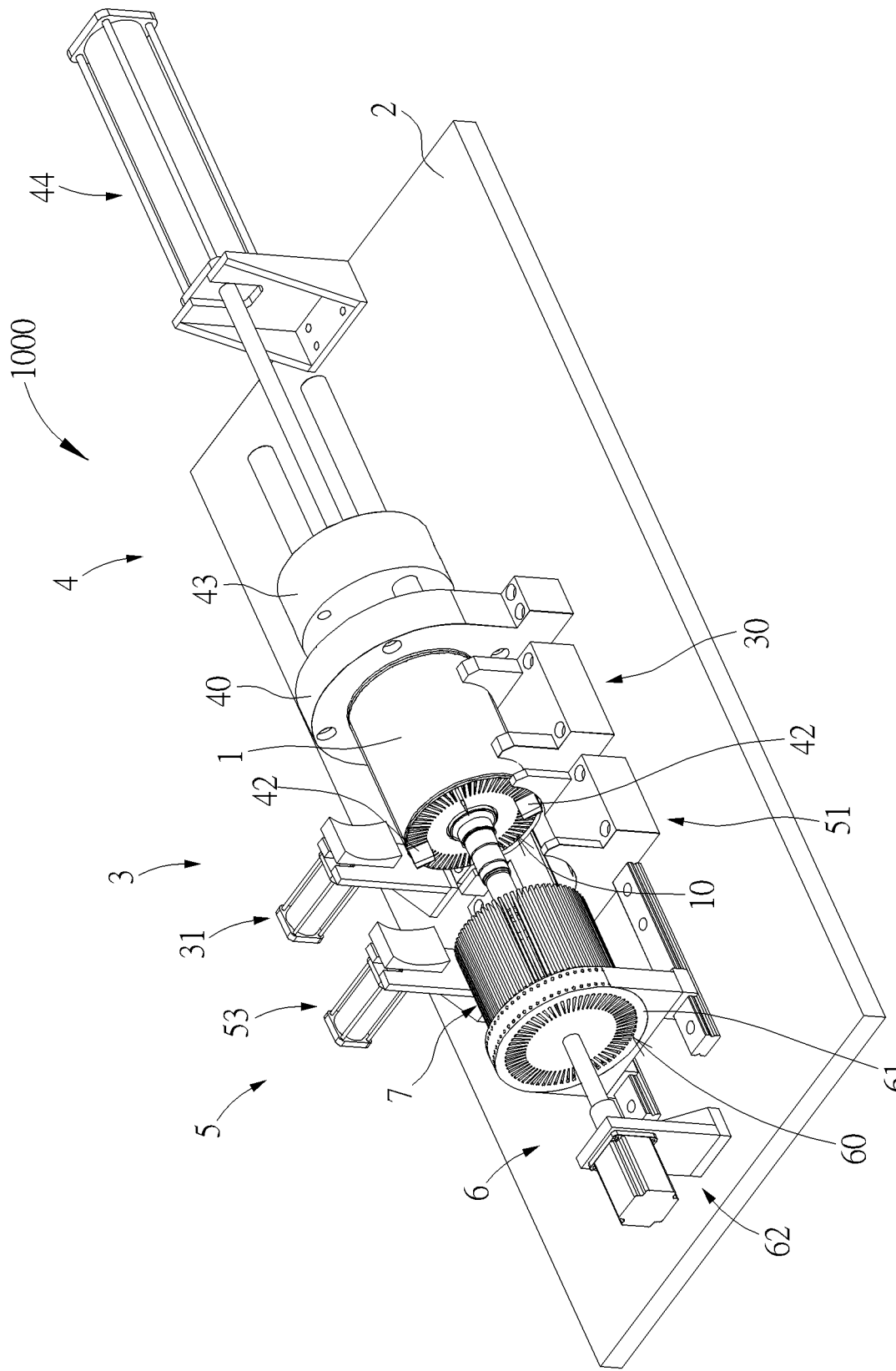
FIG. 5 is a schematic diagram illustrating a plurality of conductive bars and a conductive bar assembling plate being assembled according to an embodiment of the present invention.
Figure 6:
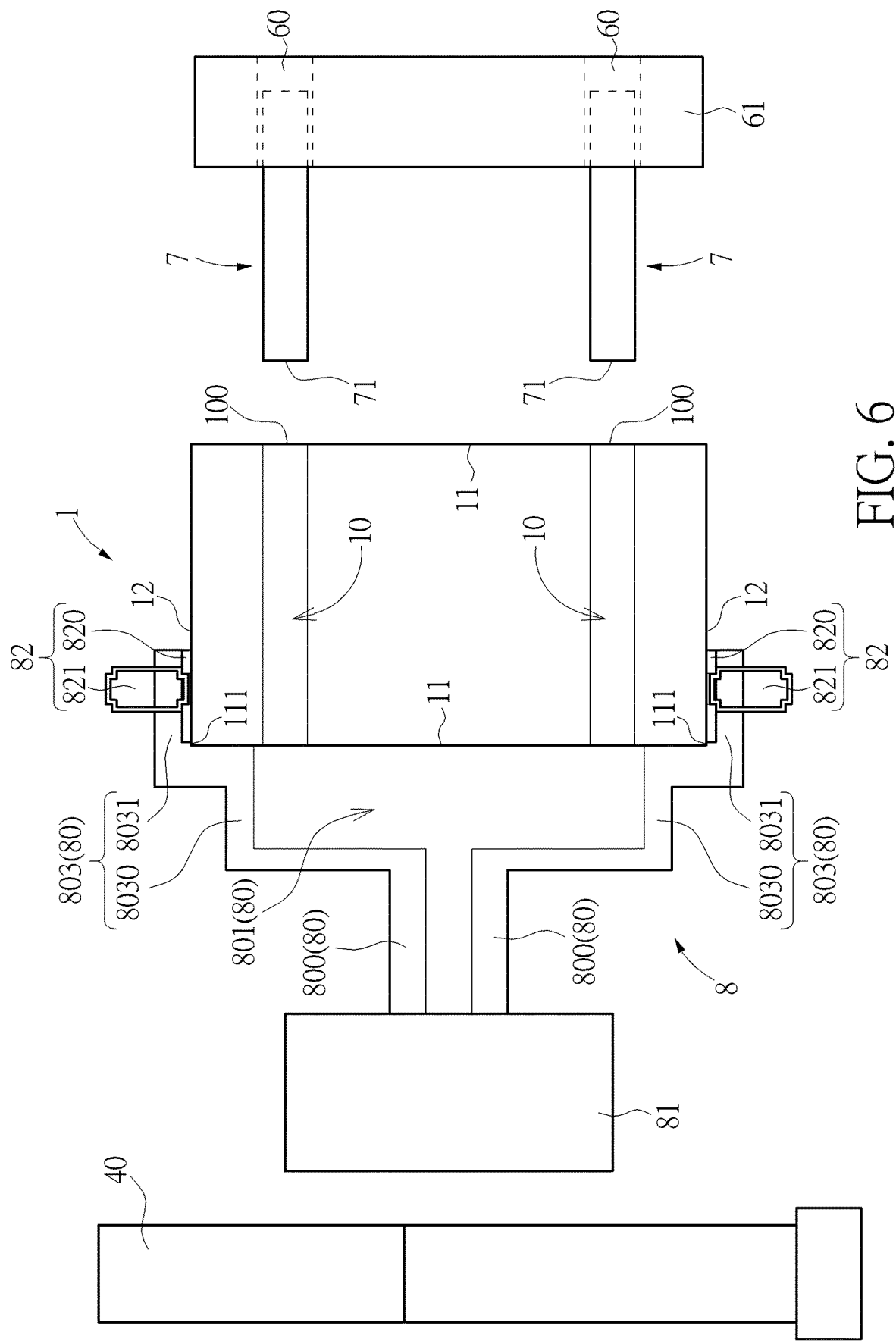
FIG. 6 is a sectional diagram of the plurality of conductive bars being pre-positioned on a side of the rotor according to an embodiment of the present invention.

Please refer to FIG. 1-6. FIG. 5 is a schematic diagram illustrating a plurality of conductive bars 7 and a conductive bar assembling plate 61 of the assembly apparatus 1000 being assembled according to an embodiment of the present invention. FIG. 6 is a sectional diagram of the plurality of conductive bars 7 being pre-positioned on a side of the rotor 1 according to an embodiment of the present invention. As shown in FIGS. 1-5, the assembly apparatus 1000 further comprises the plurality of conductive bars 7, and each one of the plurality of conductive bars 7 has a rear end and a front end 71 opposite the rear end. Each one of the plurality of conductive bars 7 is inserted into one of the plurality of assembling slots 60 through the rear end of each of the plurality of conductive bars 7. The conductive bar driving module 6 comprises the conductive bar assembling plate 61 and the conductive bar driving cylinder 62. The conductive bar assembling plate 61 is movably disposed on the base 2, wherein an axis of the plurality of assembling slots 60 passes through the conductive bar assembling plate 61. The conductive bar driving cylinder 62 is disposed on a side of the conductive bar assembling plate 61, and the conductive bar driving cylinder 62 is used to drive the conductive bar assembling plate 61 closer toward or farther from the rotor 1.

Figure 7:
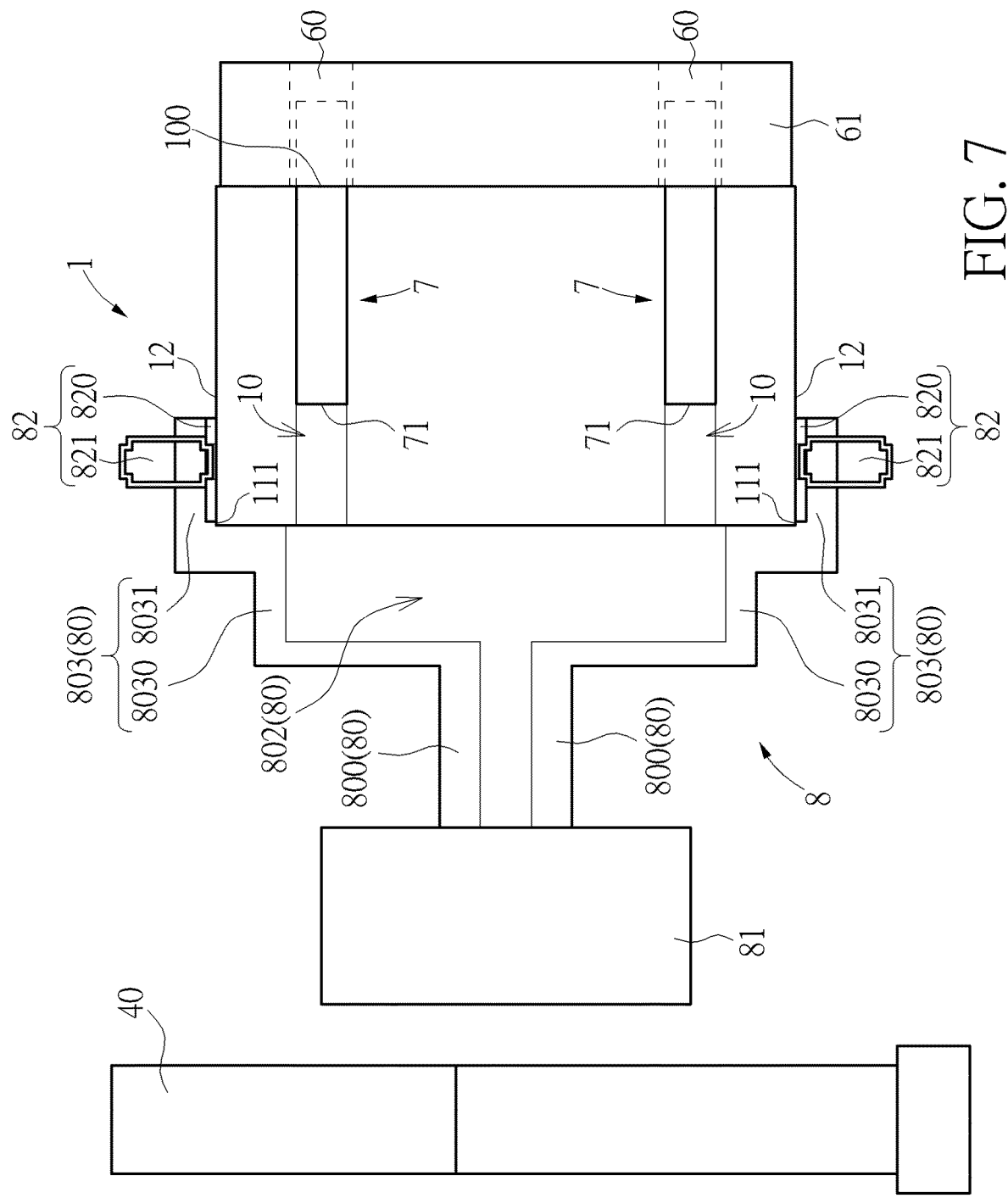
FIG. 7 is a sectional diagram of the plurality of conductive bars sealing a plurality of slots according to an embodiment of the present invention.

Please refer to FIGS. 6 and 7. FIG. 7 is a sectional diagram of the plurality of conductive bars 7 sealing the plurality of slots 10 according to an embodiment of the present invention. In practical application, the assembly apparatus 1000 further comprises a pumping module 8 disposed on the base 2 while being between the rotor fixing module 3 and the rotor 1. In the present invention, the pumping module 8 is used to guide and assist the plurality of conductive bars 7 on the conductive bar assembling plate 61 to insert into the corresponding slots 10 of the rotor 1. As shown in FIG. 6, the rotor 1 has two end faces 11 and a peripheral face 12. One of the two end faces 11 is configured to face the pumping module 8. The other of the two end faces 11 is opposite the one of the two end faces 11 while facing the conductive bar assembling plate 61. The peripheral face 12 connects the two end faces 11. The pumping module 8 comprises an exhaust hood 80 and a pump 81. The pump 81 is coupled to the exhaust hood 80. A first pumping chamber 801 is formed inside the exhaust hood 80, and the exhaust hood 80 can attach to one of the two end faces 11 of the rotor 1. It should be noted that when the aforementioned exhaust hood 80 is attached to the one of the two end faces 11, and when the front end 71 of the plurality of conductive bars 7 seals an opening 100 of the plurality of slots 100 on the other of the two end faces 11 (as shown in FIG. 7), the first pumping chamber 801 of the exhaust hood 80 is connected to all of the slots 10 of the rotor 1 and cooperatively form a first sealed chamber 802. Subsequently, the pump 81 is able to vacuum the first sealed chamber 802 such that a suction force is generated on the front end 71 of the plurality of conductive bars 7, thereby drawing the plurality of conductive bars 7 into the corresponding slots 10 of the rotor 1.

Furthermore, the exhaust hood 80 has an exhaust hood body 800 and an exhaust hood periphery 803, wherein the first pumping chamber 801 is formed inside the exhaust hood body 800. As shown in FIG. 6, the exhaust hood periphery 803 is extended from the exhaust hood body 800 and abuts against an edge 111 of one of the two end faces 11 of the rotor 1. Furthermore, the exhaust hood periphery 803 has a first flange 8030 and a second flange 8031. Wherein, the first flange 8030 is extended from the exhaust hood body 800 and abuts the one of the two end faces 11, while the second flange 8031 extends from the first flange 8030 and abuts the peripheral face 12 of the rotor 1. Additionally, the pumping module 8 of the embodiment of the present invention further comprises a sealing structure 82. The sealing structure 82 comprises a sealing ring 820 and a sealing screw 821. The sealing ring 820 is disposed between the second flange 8031 and the peripheral face 12, whereas the sealing screw 821 passes through the second flange 8031 to be screwed onto the peripheral face 12. During the process of the sealing screw 821 passing through the second flange 8031 and being screwed onto the peripheral face 12, the sealing screw 821 simultaneously presses against the sealing ring 820 through the second flange 8031 such that the sealing ring 820 and the peripheral face 12 are tightly fitted against each other to achieve a sealing effect.

Figure 8:
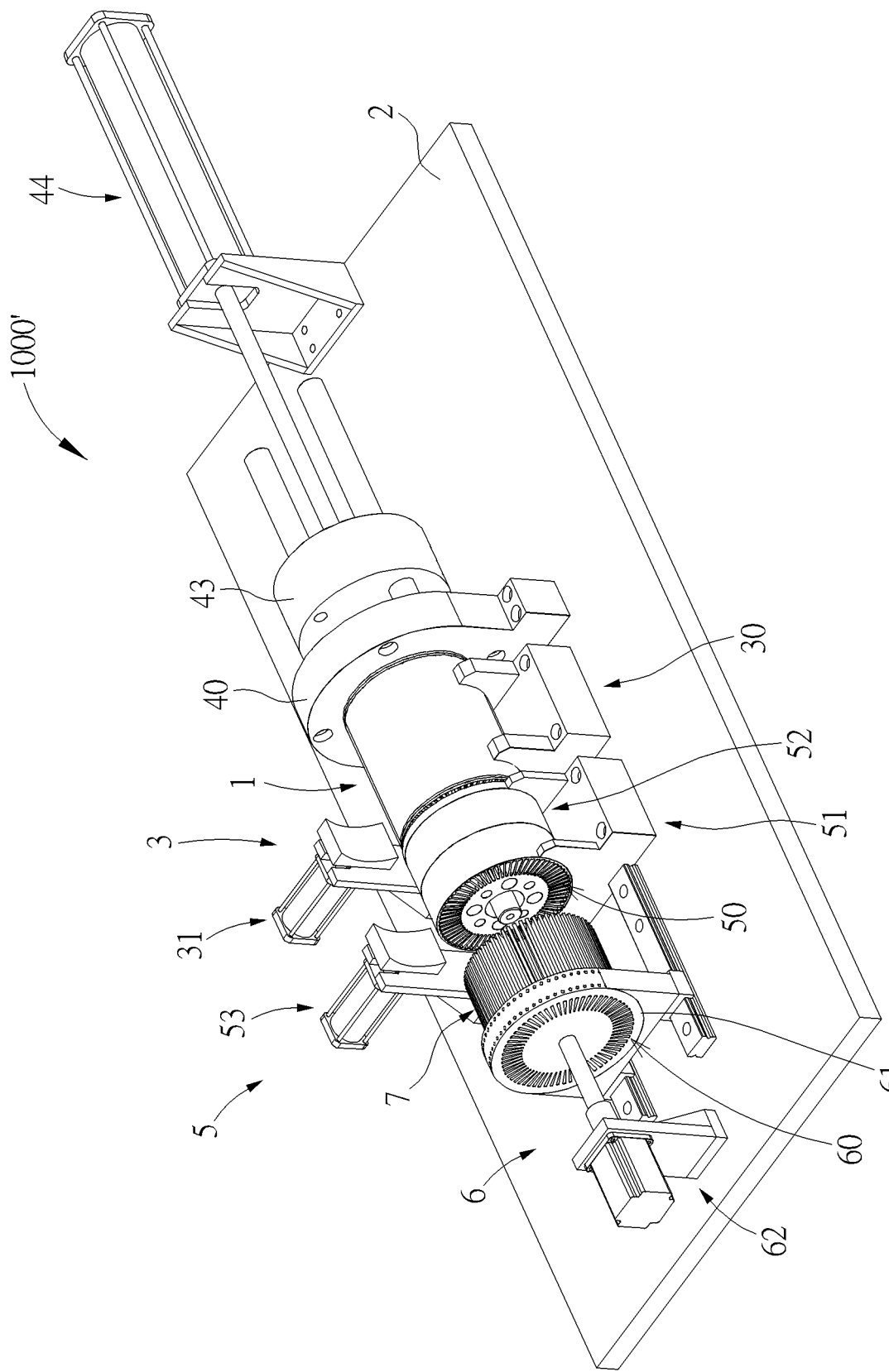
FIG. 8 is a diagram of the assembly apparatus according to another embodiment of the present invention.

Please refer to FIG. 8. FIG. 8 is a diagram of the assembly apparatus 1000' according to another embodiment of the present invention. As shown in FIG. 8, the substantial difference between the assembly apparatus 1000' and the abovementioned assembly apparatus 1000 is that the assembly apparatus 1000' further comprises a second alignment module 5. The second alignment module 5 is disposed between the rotor fixing module 3 and the conductive bar driving module 6 while having a plurality of orientation holes 50, and the second alignment module 5 comprises a guiding mount base 51 and a guiding mount 52. The guiding mount base 51 is disposed on the base 2, the guiding mount 52 is movably disposed on the guiding mount base 51, and each one of the plurality of orientation holes 50 is configured on the guiding mount 52. Furthermore, the guiding mount 52 has a first guiding mount end face 521 and a second guiding mount end face 522. The first guiding mount end face 521 faces the conductive bar driving module 7, the second guiding mount end face 522 faces the first alignment module 4, and a linear direction perpendicularly connecting the first guiding mount end face 521 and the second guiding mount end face 522 is defined as a longitudinal direction A.

Figure 9:
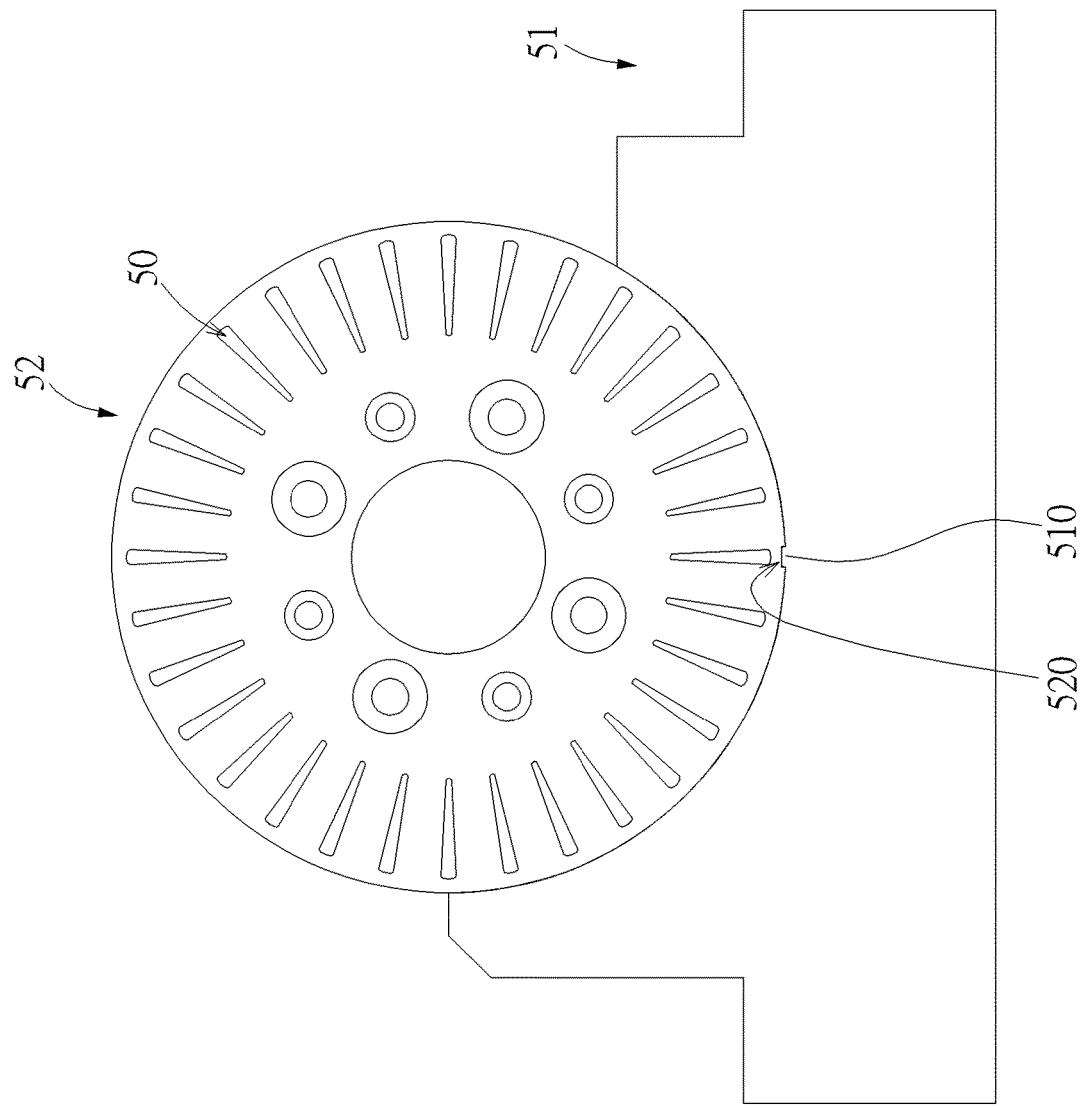
FIG. 9 is a diagram of a guiding mount base and a guiding mount according to another embodiment of the present invention.

Please refer to FIGS. 8 and 9. FIG. 9 is a diagram of the guiding mount base 51 and the guiding mount 52 according to another embodiment of the present invention. As shown in FIGS. 8 and 9, the guiding mount base 51 has a first alignment part 510, and the guiding mount 52 has a second alignment part 520. When assembling the guiding mount 52 and the guiding mount base 51, the second alignment part 520 of the guiding mount 52 needs to be aligned with the first alignment part 510 of the guiding mount base 51. Subsequently, the second alignment part 520 can be latched with the first alignment part 510. In this manner, each of the plurality of orientation holes 50 on the guiding mount base 51 can be aligned with the plurality of assembling slots 60 of the conductive bar driving module 6 and the plurality of slots 10 of the rotor 110 to facilitate subsequent assembly and installation. That is, the first alignment part 510 of the guiding mount base 51 is used in conjunction with the second alignment part 520 of the guiding mount 52 so that the guiding mount 52 can be aligned on the guiding mount base 51.

Figure 10:
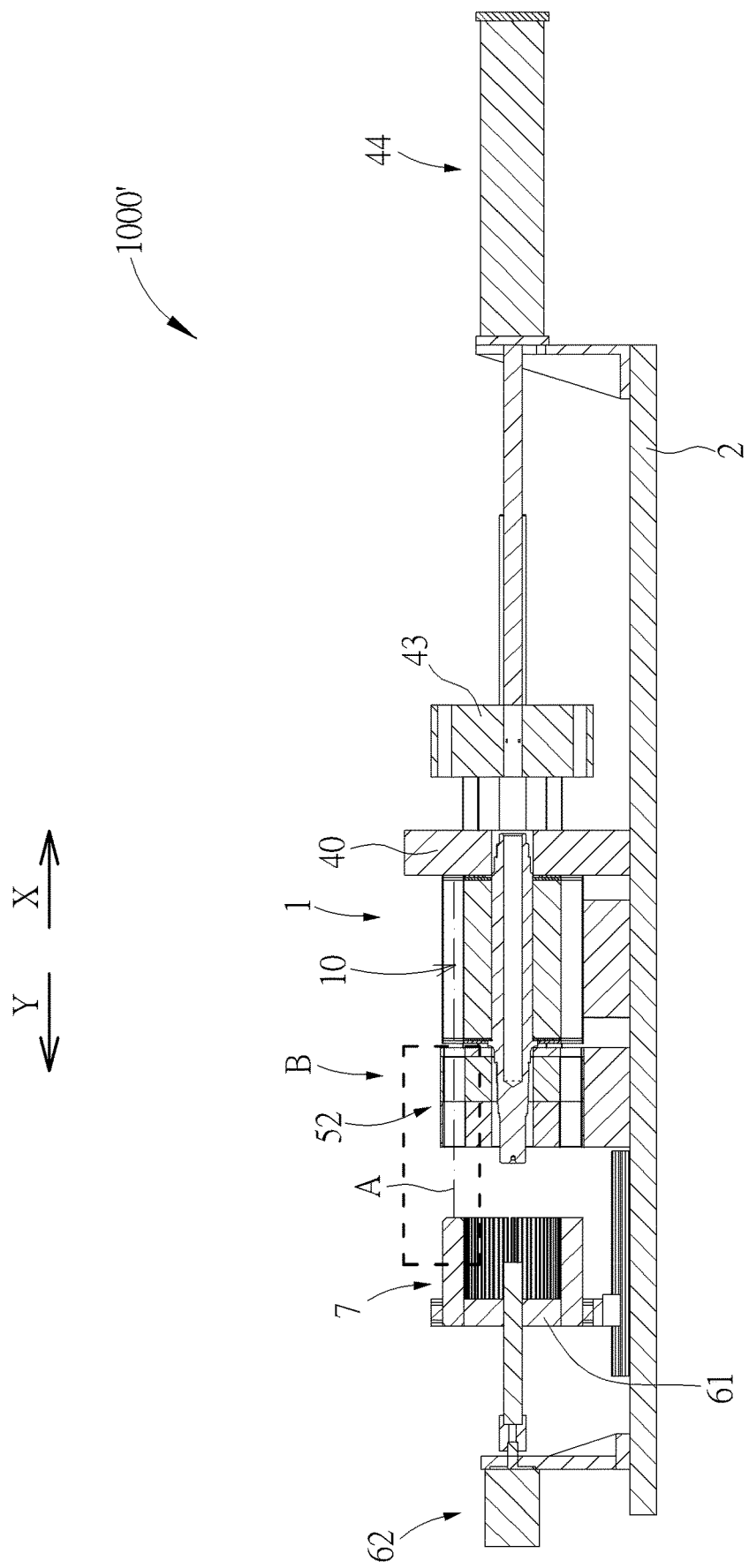
FIG. 10 is a sectional diagram of the assembly apparatus according to another embodiment of the present invention.
Figure 11:
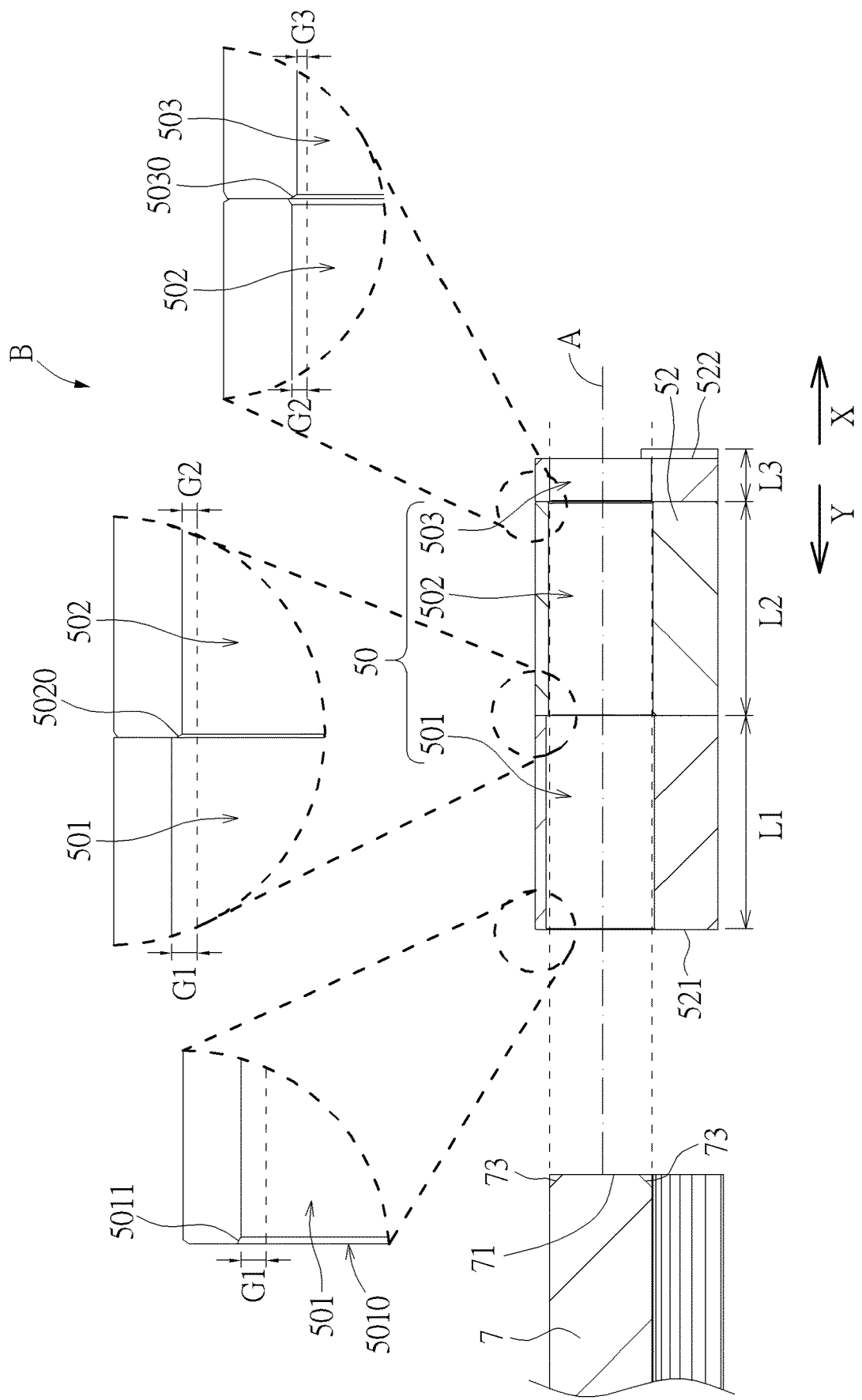
FIG. 11 is a diagram of the assembly apparatus in FIG. 10 with area B being enlarged according to another embodiment of the present invention.

Please refer to FIGS. 10 and 11. FIG. 10 is a sectional diagram of the assembly apparatus 1000' according to another embodiment of the present invention. FIG. 11 is a diagram of the assembly apparatus 1000' in FIG. 10 with area B being enlarged according to another embodiment of the present invention. As shown in FIG. 9 and FIG. 10, each of the plurality of orientation holes 50 comprises a first channel 501, a second channel 502, and a third channel 503. The first channel 501 has an opening on the first guiding mount end face 521, and a gap G1 is formed between a wall of the first channel 501 and the plurality of conductive bars 7. The second channel 502 communicates with the first channel 501, and a second gap G2 is formed between a wall of the second channel 502 and the plurality of conductive bars 7. The third channel 503 communicates with the second channel 502 and has an opening on the second guiding mount end face 522. A third gap G3 is formed between a wall of the third channel 503 and the plurality of conductive bars 7, wherein the first gap G1 is larger than the second gap G2, and the second gap G2 is larger than the third gap G3. That is, the gap between the plurality of conductive bars 7 and the wall of the first channel 501, the gap between the plurality of conductive bars 7 and the wall of the second channel 502, and the gap between the plurality of the conductive bars 7 and the wall of the third channel 503 is gradually decreasing. Therefore, when the plurality of conductive bars 7 are assembled along a first direction X at the plurality of orientation holes 50, the gradually decreasing gap between the plurality of conductive bars 7 and the wall of the first channel 501, the second channel 502, and the third channel 503 facilitates the plurality of conductive bars 7 to pass through the first channel 501 and the second channel 502 with larger gaps. The third channel 503 with the smaller gap can limit the position and movement of the plurality of conductive bars 7.

Additionally, a first channel opening 5010 is formed by the first channel 501 on the first guiding mount end face 521, and a first chamfer edge 5011 is formed around the perimeter of the first channel opening 5010. The first chamfer edge 5011 is configured to guide the front end 71 of the plurality of conductive bars 7 into the first channel 501. A second chamfer edge 5020 is formed where the first channel 501 communicates with the second channel 502, and the second chamfer edge 5020 is configured to guide the front end 71 of the plurality of conductive bars 7 from the first channel 501 into the second channel 502. A third chamfer edge 5030 is formed where the second channel 502 communicates with the third channel 503, and the third chamfer edge 5030 is configured to guide the front end 71 of the plurality of conductive bars 7 from the second channel 502 into the third channel 503. Furthermore, the front end 71 of each of the plurality of the conductive bars 7 can be configured with a front end lead 73. The front end lead 73 can be used in conjunction with the first chamfer edge 5011, the second chamfer edge 5020, and the third chamfer edge 5030 to guide the front end 71 of the plurality of conductive bars 7 to smoothly pass through the first channel 501, the second channel 502, and the third channel 503.

As shown in FIG. 11, a first length L1 along the longitudinal direction A of the first channel 501 is larger than a second length L2 along the longitudinal direction A of the second channel 502, and the second length L2 along the longitudinal direction A of the second channel 502 is larger than a third length L3 along the longitudinal direction A of the third channel 503. As mentioned previously, the first gap G1 is larger than the second gap G2, and the second gap G2 is larger than the third gap G3. Therefore, such gap design, combined with the design in which the first length L1 is larger than the second length L2, and the second length L2 is larger than the third length L3, allows a distance through which the plurality of conductive bars 7 passes through (that is, the first length L1) while the plurality of conductive bars 7 are in a channel with the largest gap (that is, the first gap G1) to be the longest. Similarly, a distance through which the plurality of conductive bars 7 passes through (that is, the second length L2) while the plurality of conductive bars 7 are in a channel with the next largest gap (that is, the second gap G2) is the next longest. A distance through which the plurality of conductive bars 7 passes through (that is, the third length L3) while the plurality of conductive bars 7 are in a channel with the smallest gap (that is, the third gap G3) is the longest. In such an arrangement, the resistance exerted on the plurality of conductive bars 7 while the plurality of conductive bars 7 pass through the plurality of orientation holes 50 is able to be optimized through the design of said gaps and said length. The precision of alignment can also be maintained through the third gap G3 between the third channel 503 and the plurality of conductive bars 7.

Figure 12:
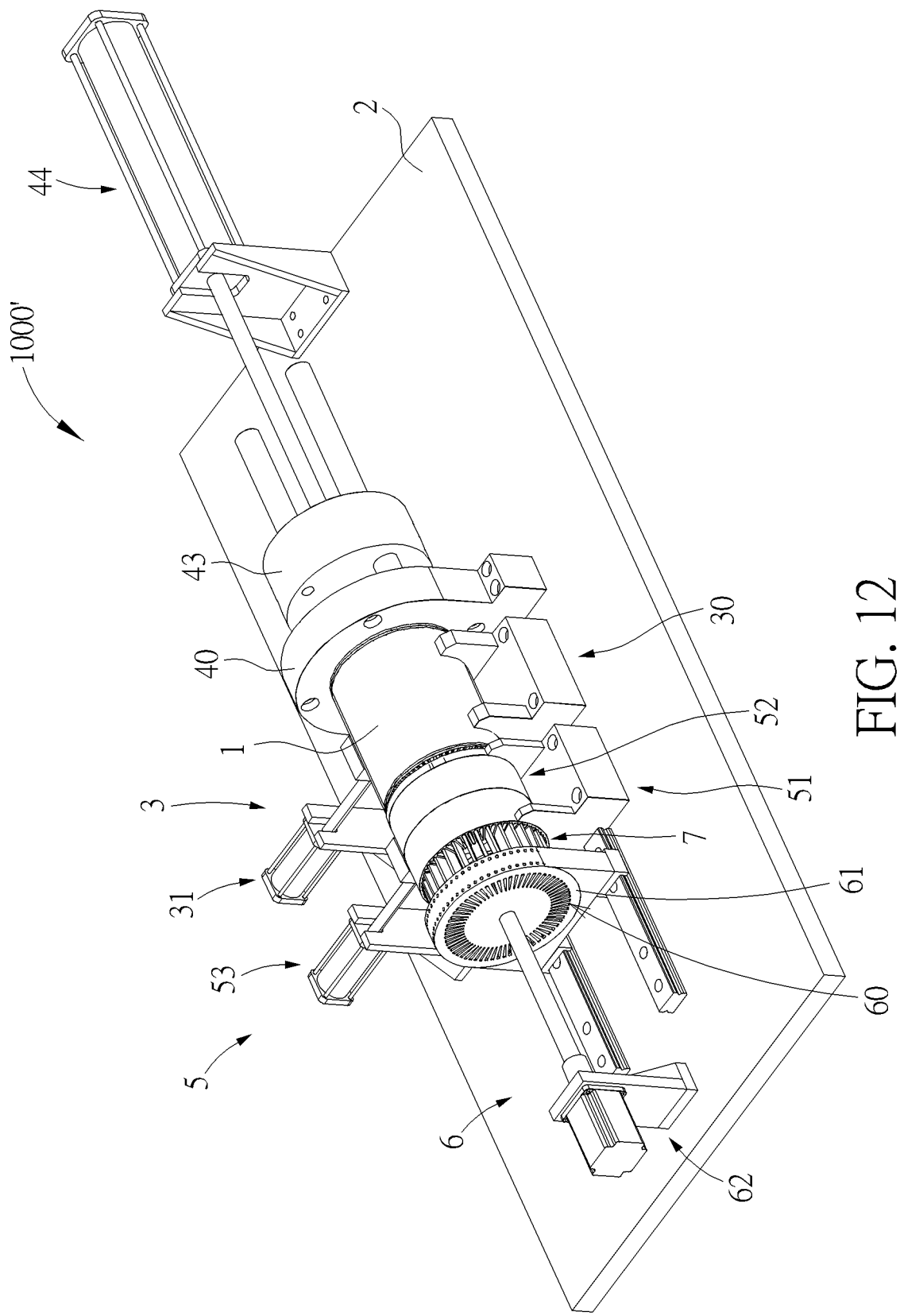
FIG. 12 is a schematic diagram illustrating the assembly apparatus and the rotor being assembled according to another embodiment of the present invention.

Please refer to FIG. 12. FIG. 12 is a schematic diagram illustrating the assembly apparatus 1000' and the rotor 1 being assembled according to another embodiment of the present invention. As shown in FIG. 12, the second alignment module 5 further comprises a guiding mount forcing cylinder 53 that is disposed on a side of the guiding mount 52. When the guiding mount 52 is disposed on the guiding mount base 51, the guiding mount forcing cylinder 53 can be configured to force the guiding mount 52 onto the guiding mount base 51. In this manner, the guiding mount 52 would not vibrate when the conductive bar driving cylinder 62 of the conductive bar driving module 6 drives the plurality of conductive bars 7 into the plurality of orientation holes 50 on the guiding mount 52, thereby increasing the system stability of the assembly apparatus 1000'.

Figure 13:
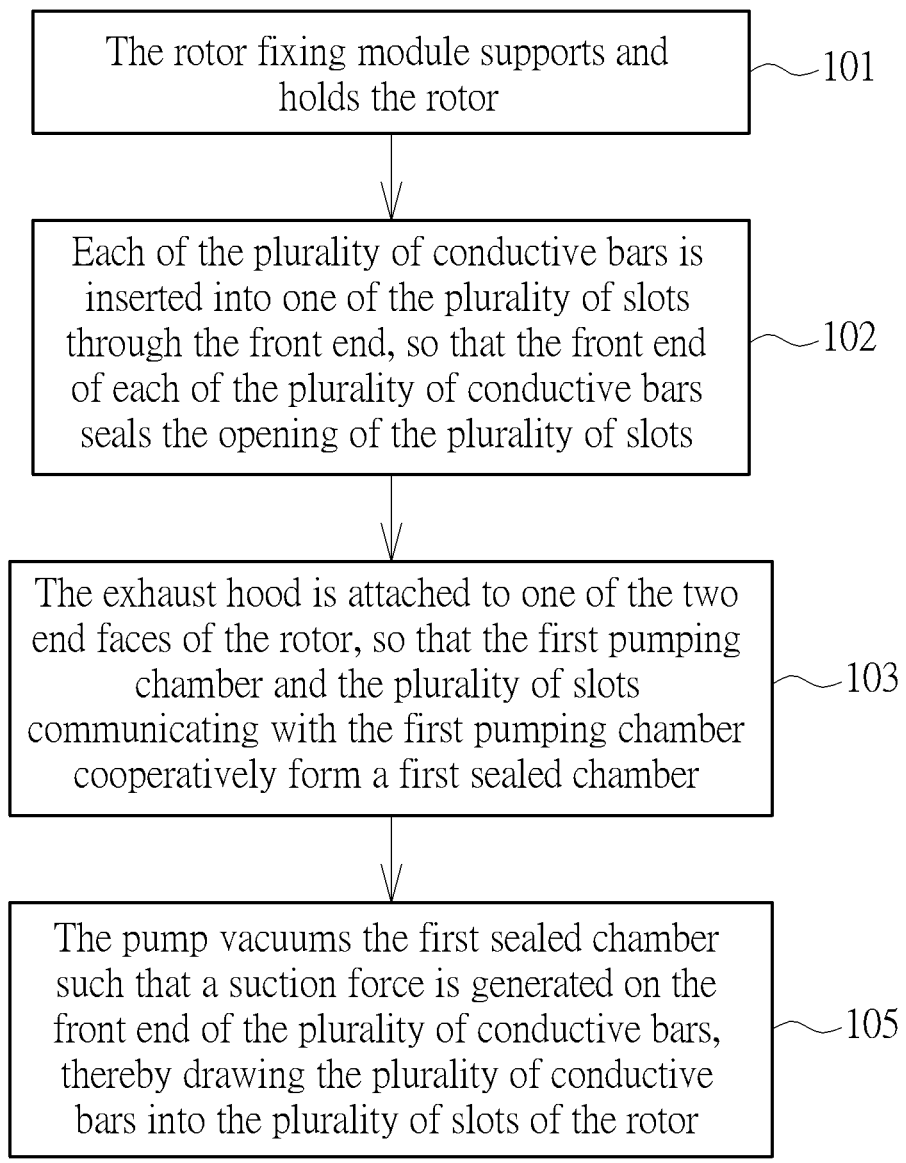
FIG. 13 is a flow chart illustrating the assembly process according to the embodiment of the present invention.

Please refer to FIG. 13. FIG. 13 is a flow chart illustrating the assembly process according to the embodiment of the present invention. The assembly process shown in FIG. 13 aims to assemble the plurality of conductive bars 7 on the plurality of assembling slots 60 of the conductive bar driving module 6. As shown in FIG. 13, the assembly process comprises the following steps:

Step 101: the rotor fixing module 3 supports and holds the rotor 1.

Step 102: each of the plurality of conductive bars 7 is inserted into one of the plurality of slots 10 through the front end 71, so that the front end 71 of each of the plurality of conductive bars 7 seals the opening 100 of the plurality of slots 10.

Step 103: the exhaust hood 80 is attached to one of the two end faces 11 of the rotor 1, so that the first pumping chamber 801 and the plurality of slots 10 communicating with the first pumping chamber 801 cooperatively form a first sealed chamber 802.

Step 105: the pump 81 vacuums the first sealed chamber 802 such that a suction force is generated on the front end 71 of the plurality of conductive bars 7, thereby drawing the plurality of conductive bars 7 into the plurality of slots 10 of the rotor 1.

The following section will detail the method to assemble the plurality of conductive bars 7 on the rotor 1 using the pumping module 8. Please also refer to FIG. 13. First, the rotor 1 is configured to be supported by the rotor mount 30 and the rotor forcing cylinder 31 pushes a side wall of the rotor 1 to force the rotor 1 onto the rotor mount 30 in a way for the rotor fixing module 3 to support and hold the rotor 1 (step 101). Then, the front end 71 of all of the plurality of conductive bars 7 is aligned with the plurality of corresponding slots 10 of the rotor 1 and abuts the opening 100 of the corresponding plurality of slots 10, such that the plurality of slots 10 are sealed (step 102). The exhaust hood 80 of the pumping module 8 is assembled to one of the two end faces 11 of the rotor 1. The sealing screw 821 is then passed through the second flange 8031 of the exhaust hood body 800 and screwed onto the peripheral face 12 of the rotor 1. During the process of screwing the sealing screw 821 to the peripheral face 12, the second flange 8031 presses against the sealing ring 820 so that the sealing ring 820 and the peripheral face 12 are tightly fitted against each other to achieve a seal between said sealing ring 820 and said peripheral face 12 (step 103).

Through the abovementioned steps, the first pumping chamber 801 of the exhaust hood 80 and all of the plurality of slots 10 communicating with the first pumping chamber 801 are able to cooperatively form a first sealed chamber 802. Then, the pump 81 of the pumping module 8 is activated to vacuum the first sealed chamber 802 (step 105), and the suction force generated on the front end 71 of all of the plurality of conductive bars 7 during the evacuation process is able to allow all of the plurality of conductive bars 7 to be smoothly inserted into the corresponding slots 10 of the rotor 1.

Compared to the prior art, when the plurality of conductive bars 7 assemble and seal the opening 100 of the slots 10 of the rotor 1, the assembly apparatus 1000, 1000' of the present invention is able to drive the pumping module 8 to attach to the rotor 1 in order to form a first sealed chamber 802. Subsequently, the pumping module 8 vacuums the first sealed chamber 802 so that a suction force is generated on the conductive bars 7 to force the conductive bars 7 into the slots 10. This design reduces the difficulty of inserting the conductive bars 7 into the slots 10, thereby increasing the efficiency when assembling the conductive bars 7.

Those skilled in the art will readily observe that numerous modifications and alterations of the apparatus and method may be made while retaining the teachings of the invention. Accordingly, the above disclosure should be construed as limited only by the metes and bounds of the appended claims.

What is claimed is:

1. An assembly apparatus for assembling a rotor, the rotor being configured with a plurality of slots passing through two end faces of the rotor, the assembly apparatus comprising:
  a base;
  a rotor fixing module disposed on the base, the rotor fixing module being configured to support and hold the rotor;
  a conductive bar driving module disposed on a side of the rotor fixing module, the conductive bar driving module comprising:
    a conductive bar assembling plate movably disposed on the base, the conductive bar assembling plate having an assembling-end face and a back-end face, the assembling-end face being configured to face the rotor fixing module, the back-end face being opposite to the assembling-end face, the conductive bar assembling plate being configured with a plurality of assembling slots connected to the assembling-end face and the back-end face, wherein each of the plurality of assembling slots forms an opening on the assembling-end face;

a plurality of conductive bars, each one of the plurality of conductive bars having a rear end and a front end opposite to the rear end, each of the plurality of conductive bars being inserted into one of the plurality of assembling slots through the rear end; and a pumping module being disposed on the base and between the rotor fixing module and the rotor, the pumping module comprising:

an exhaust hood attached to one of the two end faces of the rotor, a first pumping chamber being formed in the exhaust hood; and a pump coupled to the exhaust hood;

wherein, when the exhaust hood is attached to the one of the two end faces of the rotor, and the front end of each of the conductive bars seals the opening formed by each of the plurality of slots on the other of the two end faces, the first pumping chamber and the plurality of slots communicating with the first pumping chamber cooperatively form a first sealed chamber, such that the pump is able to vacuum the first sealed chamber and create a suction force on the front end of the plurality of conductive bars and draw the plurality of conductive bars into the plurality of slots of the rotor.

2. The assembly apparatus of claim 1, wherein the exhaust hood comprises:

an exhaust hood body, wherein the first pumping chamber is configured within the exhaust hood body; and an exhaust hood periphery extended from the exhaust hood body, the exhaust hood periphery abutting against an edge of the one of the two end faces of the rotor.

3. The assembly apparatus of claim 2, wherein the rotor has a peripheral face connected to the two end faces, the exhaust hood periphery comprises:

a first flange extended from the exhaust hood body and abutting against the one of the two end faces; and a second flange extended from the first flange and abutting against the peripheral face.

4. The assembly apparatus of claim 3, wherein the pumping module further comprises a sealing structure, the sealing structure comprises:

a sealing ring disposed between the second flange and the peripheral face; and a sealing screw passing through the second flange and being screwed onto the peripheral face, so that the sealing screw presses against the sealing ring through the second flange.

5. The assembly apparatus of claim 1, further comprising:
a first alignment module disposed on a side of the rotor fixing module, the first alignment module being configured to position the rotor so that each of the plurality of slots of the rotor is aligned with each of the plurality of assembling slots; and a second alignment module disposed between the rotor fixing module and the conductive bar driving module, the second alignment module having a plurality of orientation holes, the plurality of orientation holes being aligned with the plurality of assembling slots.

6. The assembly apparatus of claim 5, wherein the second alignment module comprises:

a guiding mount base disposed on the base, the guiding mount base having a first alignment part; and a guiding mount disposed on the guiding mount base, the guiding mount having a second alignment part, the first alignment part and the second alignment part cooperatively position the guiding mount on the guiding mount base, wherein each of the plurality of orientation holes is configured on the guiding mount.

7. The assembly apparatus of claim 6, wherein the guiding mount comprises a first guiding mount end face and a second guiding mount end face, the first guiding mount end face faces the conductive bar driving module, the second guiding mount end face faces the first alignment module, and each of the plurality of orientation holes comprises:

a first channel with an opening on the first guiding mount end face, a first gap being formed between a wall of the first channel and the conductive bar;

a second channel communicating with the first channel, a second gap being formed between a wall of the second channel and the conductive bar; and a third channel communicating with the second channel and having an opening on the second guiding mount end face, a third gap being formed between a wall of the third channel and the conductive bar, wherein the first gap is larger than the second gap, and the second gap is larger than the third gap.

8. The assembly apparatus of claim 7, wherein a linear direction perpendicularly connecting the first guiding mount end face and the second guiding mount end face is defined as a longitudinal direction, a first length along the longitudinal direction of the first channel is larger than a second length along the longitudinal direction of the second channel, and the second length along the longitudinal direction of the second channel is larger than a third length along the longitudinal direction of the third channel.

9. The assembly apparatus of claim 7, wherein a first channel opening of the first channel is formed on the first guiding mount end face, a first chamfer edge is formed around the perimeter of the first channel opening, and the first chamfer edge is configured to guide a front end of the conductive bar into the first channel.

10. The assembly apparatus of claim 7, wherein a second chamfer edge is formed at the connection between the first channel and the second channel, the second chamfer edge is configured to guide the front end of the conductive bar from the first channel into the second channel, a third chamfer edge is formed at the connection between the second channel and the third channel, the third chamfer edge is configured to guide the front end of the conductive bar from the second channel into the third channel.

11. The assembly apparatus of claim 6, wherein the second alignment module further comprises:

a guiding mount forcing cylinder disposed on a side of the guiding mount, the guiding mount forcing cylinder being configured to force the guiding mount onto the guiding mount base.

12. The assembly apparatus of claim 1, wherein the first alignment module comprises:

a rotor alignment plate fixedly disposed on the base and abutting a side of the rotor, the rotor alignment plate is configured with a rotor alignment slot; and a rotor alignment bar passing through the rotor alignment slot of the rotor alignment plate and one of the plurality of corresponding slots of the rotor.

13. The assembly apparatus of claim 12, wherein the first alignment module further comprises:

a bar alignment plate movably disposed on a side of the rotor alignment plate for fixing the rotor alignment bar; and an alignment bar driving cylinder disposed on a side of the bar alignment plate, the alignment bar driving cylinder being configured to drive the bar alignment plate closer toward the rotor alignment plate so that the rotor alignment bar passes through the plurality of slots.

14. The assembly apparatus of claim 1, wherein the rotor fixing module comprises:
   a rotor mount disposed on the base and configured to support the rotor; and
   a rotor forcing cylinder disposed on a side of the rotor mount, the rotor forcing cylinder being configured to force the rotor to abut the rotor mount.

15. The assembly apparatus of claim 1, wherein the conductive bar driving module further comprises:
   a conductive bar driving cylinder disposed on a side of the conductive bar assembling plate, the conductive bar driving cylinder being configured to drive the conductive bar assembling plate closer toward the second alignment module so that the plurality of conductive bars pass through the plurality of corresponding slots of the rotor.

16. An assembly method to assemble a rotor using an assembly apparatus, the rotor being configured with a plurality of slots passing through two end faces of the rotor, the assembly method comprising: providing the assembly apparatus comprising a base, a rotor fixing module, a conductive bar driving module, a plurality of conductive bars, and a pumping module, the rotor fixing module being disposed on the base, the conductive bar driving module being disposed on a side of the rotor fixing module and comprising a conductive bar assembling plate, the conductive bar assembling plate being movably disposed on the base, the conductive bar assembling plate having an assembling-end face and a back-end face, the assembling-end face being configured to face the rotor fixing module, the back-end face being opposite to the assembling-end face, the conductive bar assembling plate being configured with a plurality of assembling slots connected to the assembling-end face and the back-end face, wherein each of the plurality of assembling slots forms an opening on the assembling-end face, each one of the plurality of conductive bars having a rear end, the pumping module being disposed on the base and comprising an exhaust hood and a pump, the exhaust hood being able to be attached to the back-end face, a first pumping chamber being formed in the exhaust hood, the pump being coupled to the exhaust hood; supporting and holding the rotor by the rotor fixing module
   inserting each of the plurality of conductive bars into one of the plurality of assembling slots through the rear end, so that the rear end of each of the conductive bars seals the opening formed by each of the plurality of assembling slots;
   attaching the exhaust hood to the back-end face, so that the first pumping chamber and the plurality of assembling slots communicating with the first pumping chamber cooperatively form a first sealed chamber; and
   evacuating the first sealed chamber by the pump and creating a suction force on the rear end of the plurality of conductive bars to draw the plurality of conductive bars into the plurality of assembling slots.

\* \* \* \* \*